(12) United States Patent
Roach

(10) Patent No.: US 10,823,058 B2
(45) Date of Patent: Nov. 3, 2020

(54) THERMOPLASTIC NOSECONE FOR A TURBINE ENGINE

(71) Applicant: United Technologies Corporation, Hartford, CT (US)

(72) Inventor: James T. Roach, Vernon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 292 days.

(21) Appl. No.: 14/764,447

(22) PCT Filed: Jan. 29, 2013

(86) PCT No.: PCT/US2013/023635
§ 371 (c)(1),
(2) Date: Jul. 29, 2015

(87) PCT Pub. No.: WO2014/120123
PCT Pub. Date: Aug. 7, 2014

(65) Prior Publication Data
US 2015/0361806 A1 Dec. 17, 2015

(51) Int. Cl.
*F02C 7/04* (2006.01)
*B64C 11/14* (2006.01)

(52) U.S. Cl.
CPC ............... *F02C 7/04* (2013.01); *B64C 11/14* (2013.01); *F05D 2220/32* (2013.01);
(Continued)

(58) Field of Classification Search
CPC .... F02C 7/04–057; F02C 7/042; F02C 7/045; F02C 7/047; F02C 7/05; F02C 7/052; F02C 7/055; B64C 11/14; B64C 11/02; F01D 1/02; F01D 9/04; Y02T 50/671; Y02T 50/672; F05D 2300/603; F05C 2225/00;
(Continued)

(56) References Cited

U.S. PATENT DOCUMENTS 2,838,435 A 6/1958 Hewett
3,640,798 A * 2/1972 Deeds ................... B32B 3/12
428/117
(Continued)

FOREIGN PATENT DOCUMENTS

EP 2369155 9/2011

OTHER PUBLICATIONS

"Biomaterials in Clinical Practice: Advances in Clinical Research and Medical Devices" Springer, Oct. 20, 2017, p. 62.*
(Continued)

*Primary Examiner* — Mark A Laurenzi
*Assistant Examiner* — Xiaoting Hu
(74) *Attorney, Agent, or Firm* — Getz Balich LLC

(57) ABSTRACT

A nosecone for a turbine engine includes a nosecone body and a nosecone mount. The nosecone body extends along an axis between a tip end and a base end. The nosecone body is configured from or otherwise includes thermoplastic material. The nosecone body includes a shell and an arrangement of ribs, which structurally support at least a portion of the shell. A thickness of the arrangement of ribs is greater than or substantially equal to approximately one half of a thickness of the shell. The nosecone mount is adapted to connect the nosecone body to a component of the turbine engine.

18 Claims, 7 Drawing Sheets

(52) U.S. Cl.
CPC ...... *F05D 2300/10* (2013.01); *F05D 2300/40* (2013.01); *F05D 2300/43* (2013.01)

(58) Field of Classification Search
CPC .... F05C 2225/04–12; F02K 1/04; F02K 3/06; B64D 33/02; B64D 2033/0206–0246; B64D 2033/022
USPC ................................ 416/94, 245 R; 428/117
See application file for complete search history.

(56) References Cited

U.S. PATENT DOCUMENTS

| | | | |
|---|---|---|---|
| 3,873,236 A * | 3/1975 | Gall | F01D 7/00 416/156 |
| 3,990,814 A * | 11/1976 | Leone | B64C 7/02 416/245 R |
| 4,012,549 A * | 3/1977 | Slysh | B64C 1/08 244/119 |
| 4,015,653 A * | 4/1977 | Slysh | H01Q 1/1235 160/213 |
| 4,470,862 A | 9/1984 | More et al. | |
| 4,744,214 A | 5/1988 | Monsarrat et al. | |
| 4,818,318 A * | 4/1989 | McMahon | D02G 3/402 156/166 |
| 4,957,415 A * | 9/1990 | Paul | B29C 70/04 264/122 |
| 5,149,251 A * | 9/1992 | Scanlon | B64C 11/14 416/224 |
| 5,252,160 A * | 10/1993 | Scanlon | B29C 33/02 156/196 |
| 5,252,165 A | 10/1993 | Fecto et al. | |
| 5,573,378 A | 11/1996 | Barcza | |
| 5,833,435 A | 11/1998 | Smith | |
| 6,196,794 B1 * | 3/2001 | Matsumoto | B29C 65/5042 415/191 |
| 6,223,616 B1 | 5/2001 | Sheridan | |
| 6,358,014 B1 * | 3/2002 | Chou | B64C 11/14 29/889.1 |
| 7,591,754 B2 | 9/2009 | Duong et al. | |
| 7,739,865 B2 | 6/2010 | Prasad et al. | |
| 7,824,305 B2 | 11/2010 | Duong et al. | |
| 7,926,260 B2 | 4/2011 | Sheridan et al. | |
| 7,938,368 B2 | 5/2011 | Hogate | |
| 7,955,046 B2 | 6/2011 | McCune et al. | |
| 8,205,432 B2 | 6/2012 | Sheridan | |
| 8,286,654 B2 | 10/2012 | Prasad et al. | |
| 8,540,492 B2 * | 9/2013 | Schreiber | F02C 7/04 416/245 R |
| 2002/0077233 A1 * | 6/2002 | Oldani | B23Q 1/52 483/55 |
| 2005/0231052 A1 | 10/2005 | Rockarts et al. | |
| 2010/0192351 A1 * | 8/2010 | Runnemalm | B21D 51/10 29/428 |
| 2010/0226786 A1 * | 9/2010 | Mahan | F01D 5/026 416/245 R |
| 2010/0270427 A1 | 10/2010 | Barrientos et al. | |
| 2011/0047959 A1 | 3/2011 | DiBenedetto | |
| 2012/0134843 A1 * | 5/2012 | Bottome | F01D 5/066 416/245 R |
| 2014/0186166 A1 * | 7/2014 | Kostka | F01D 5/143 415/182.1 |

OTHER PUBLICATIONS

Goh, Cynthia. "Atomic Force Microscopy of Polymer Films" in Advances in Chemical Physics, vol. 194. John Wiley & Sons, 2009. p. 34.*

Baker et al. "Composite Materials for Aircraft Structures" (Year: 2004).*

Michelle M. Gauthier, "Engineering Thermoplastics", Engineered Materials Handbook Desk Edition. (Year: 1995).*

* cited by examiner

THERMOPLASTIC NOSECONE FOR A TURBINE ENGINE

This application claims priority to PCT Patent Application No. PCT/US13/23635 filed Jan. 29, 2013, which is hereby incorporated by reference.

BACKGROUND OF THE INVENTION

1. Technical Field

This disclosure relates generally to a turbine engine and, more particularly, to a turbine engine nosecone.

2. Background Information

A typical turbojet or turbofan engine includes a nosecone for directing air into a gas path of the engine. The nosecone may be connected to a hub of a compressor or fan rotor. Such a nosecone is often referred to as a spinner. Alternatively, the nosecone may be connected to a hub of a static support structure.

A typical nosecone is constructed from a material that is strong enough to survive high and low altitude environments. The material should also be relatively inexpensive and light weight.

There is a need in the art for an improved nosecone for a turbine engine.

SUMMARY OF THE DISCLOSURE

According to an aspect of the invention, a nosecone for a turbine engine is provided that includes a nosecone body and a nosecone mount. The nosecone body extends along an axis between a tip end and a base end. The nosecone body is configured from or otherwise includes thermoplastic material. The nosecone body includes a shell and an arrangement of ribs, which structurally support at least a portion of the shell. A thickness of the arrangement of ribs is greater than or substantially equal to approximately one half of a thickness of the shell. The nosecone mount is adapted to connect the nosecone body to a component of the turbine engine.

According to another aspect of the invention, another nosecone for a turbine engine is provided that includes a nosecone body and a nosecone mount. The nosecone body extends along an axis between a tip end and a base end. The nosecone body includes a shell and an arrangement of ribs, which structurally support at least a portion of the shell. The arrangement of ribs is configured from or otherwise includes thermoplastic material and/or polycrystalline material. The nosecone mount is adapted to connect the nosecone body to a component of the turbine engine.

According to still another aspect of the invention, a turbine engine system is provided that includes a nosecone that guides air towards a plurality of rotor blades of an engine rotor. The rotor blades are arranged circumferentially around an axis. The nosecone is configured from or otherwise includes thermoplastic. The nosecone includes a shell and an arrangement of ribs, which structurally support at least a portion of the shell. A thickness of the arrangement of ribs is greater than or substantially equal to approximately one half of a thickness of the shell.

The thickness of the arrangement of ribs may be greater than or substantially equal to the thickness of the shell.

The arrangement of ribs may be configured as an isogrid structure.

The arrangement of ribs may be configured in a repeating pattern that defines a plurality intra-rib gaps. One or more of the plurality intra-rib gaps may each be configured with a polygonal cross-sectional geometry or an arcuate cross-sectional geometry. A length of a first of the ribs may be greater than a length of a second of the ribs, where the first and the second of the ribs at least partially define one of the plurality intra-rib gaps. Alternatively or additionally, the ribs that define one of the plurality intra-rib gaps may have substantially equal lengths.

The nosecone body may include a first region and a second region that is arranged axially between the first region and the base end. The arrangement of ribs may be located in the first region. The nosecone body may also include a third region that is arranged axially between the first region and the tip end.

The nosecone body may include a first region and a second region that is arranged axially between the first region and the base end. The arrangement of ribs may be located in the second region.

The arrangement of ribs may define a plurality of intra-rib gaps. One or more of the intra-rib gaps may be at least partially filled with the thermoplastic material, and/or any other filler material.

The arrangement of ribs may be configured from or otherwise include one or more of the following materials: the thermoplastic material, polycrystalline material, thermoset material and/or metal. Alternatively or additionally, the shell may be configured from or otherwise includes one or more of the following materials: the thermoplastic material, polycrystalline material, thermoset material and/or metal.

The nosecone body may include a first layer and a second layer that is stacked and bonded with the first layer. The first layer may include the shell. The second layer may include the arrangement of ribs. The nosecone body may also include a third layer. The second layer may be arranged between and bonded to the first layer and the third layer.

The nosecone body may include a nosecone segment and a cap segment that is fastened and/or otherwise connected to the nosecone segment. The nosecone segment or the cap segment may include the arrangement of ribs.

The nosecone may be connected to the engine rotor. The engine rotor may be configured as or otherwise include a fan rotor and/or any other engine rotor.

The turbine engine system may include a stator. The nosecone may be connected to the stator.

The turbine engine system may include a gear train. The engine rotor may be connected to and driven by a second engine rotor through the gear train. The engine rotor may be configured as or otherwise include a fan rotor and/or any other engine rotor. The second engine rotor may be configured as or otherwise include a turbine rotor and/or any other engine rotor.

The foregoing features and elements may be combined in various combinations without exclusivity, unless expressly indicated otherwise. These features and elements as well as the operation of the invention will become more apparent in light of the following description and the accompanying drawings.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION OF THE INVENTION

Figure 1:
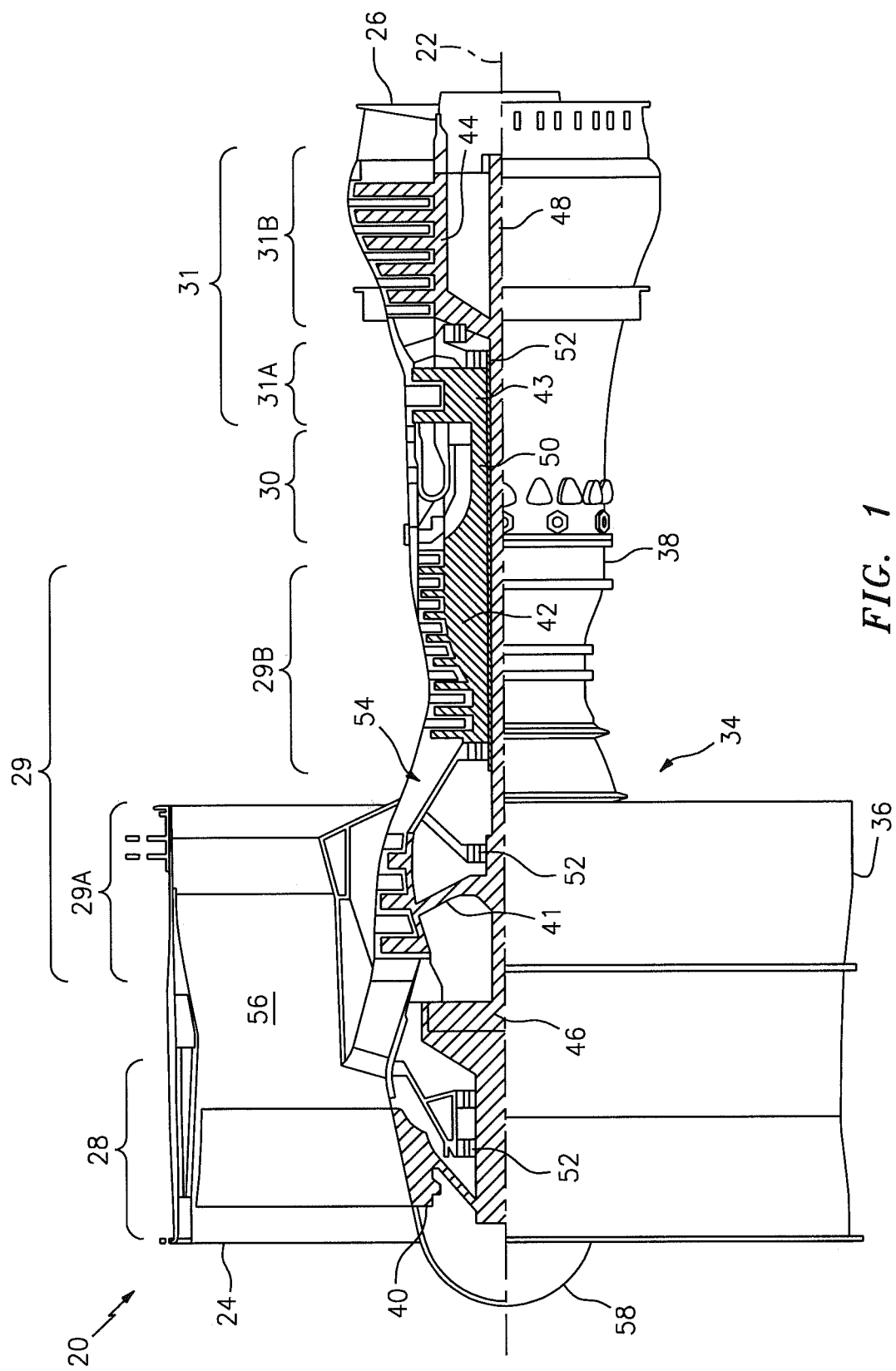
FIG. 1 is a side cutaway illustration of a geared turbofan engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed or otherwise adhered to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust or reverse thrust via a thrust reverser. The bypass air may also be utilized to cool various turbine engine components within one or more of the engine sections 29-31.

Figure 2:
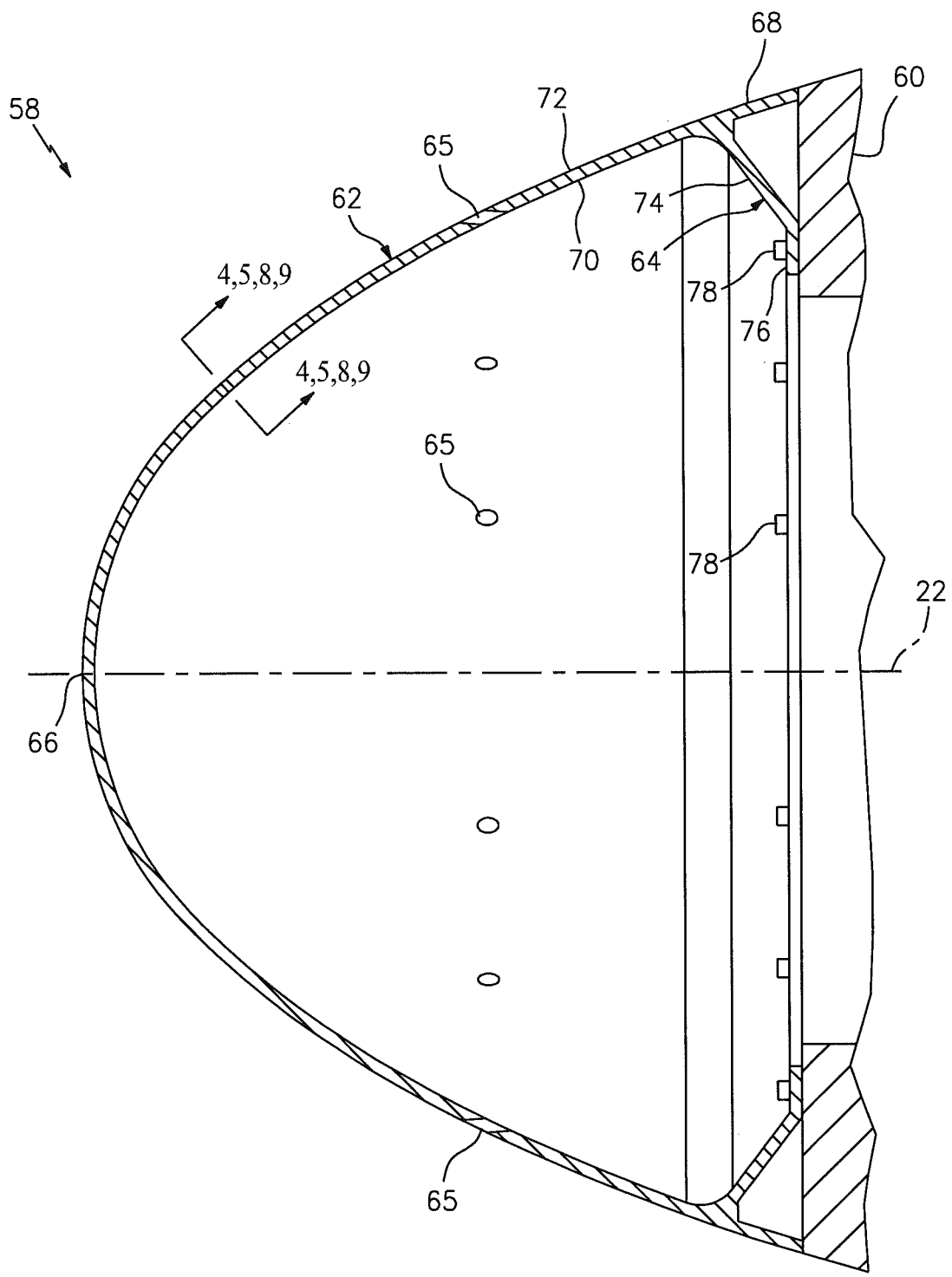
FIG. 2 is a side sectional illustration of a nosecone arranged with a turbine engine component.

FIG. 2 is a side sectional illustration of a thermoplastic nosecone 58 arranged with (e.g., upstream of) a turbine engine component 60. Referring to FIG. 1, the nosecone 58 is adapted to direct the air into the airflow inlet 24 and towards the rotor blades of the fan rotor 40 (or any other engine rotor). For example, referring again to FIG. 2, the nosecone 58 may be a spinner, where the component 60 is a rotor such as a hub of the fan rotor 40. Alternatively, the component 60 may be a stator that is, for example, connected to a turbine engine case with one or more struts.

The nosecone 58 includes a nosecone body 62 and a nosecone mount 64. The nosecone body 62 extends circumferentially around the axis 22. The nosecone body 62 extends axially along the axis 22 between an upstream tip end 66 and a downstream base end 68. The nosecone body 62 has a thickness that extends between a nosecone interior surface 70 and a nosecone exterior surface 72. The nosecone body 62 may have a parti-ellipsoidal or otherwise arcuate geometry as illustrated in FIG. 2. Alternatively, the nosecone body may have a conical geometry. The nosecone body, of course, may have various geometries other than those described above and illustrated in the drawings.

The nosecone mount 64 is configured as a mounting flange (e.g., an annular flange). Alternatively, the nosecone mount may be configured as or include one or more bosses, one or more mounting brackets and/or any other type of mounting structure and/or devices. The nosecone mount 64 extends radially and/or axially from the nosecone body 62, and connects the nosecone body 62 to the component 60. The nosecone mount 64, for example, includes an intermediate portion 74 and a mount portion 76. The intermediate portion 74 extends between and connects the nosecone body 62 and the mount portion 76. The mount portion 76 is fastened to the component 60 with one or more fasteners 78. The fasteners 78 may be mated with the mount portion 76 and the component 60 by inserting a tool (not shown) respectively through one or more apertures 65. Alternatively or additionally, the mount portion 76 may be bonded to the component 60. The nosecone mount, of course, may have various configurations other than that described above and illustrated in the drawings.

Figure 3:
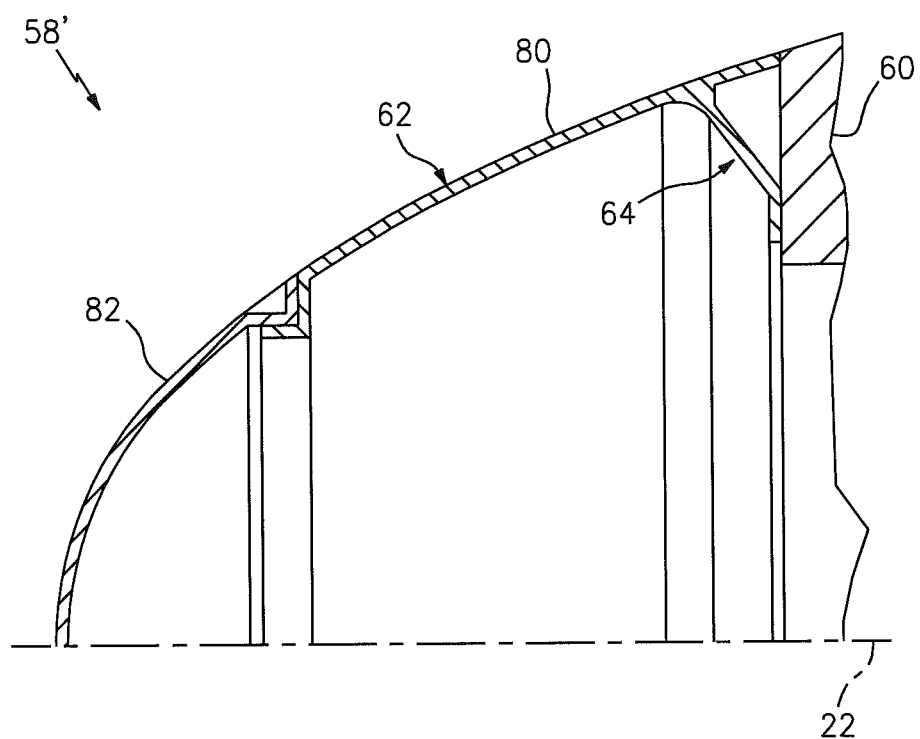
FIG. 3 is a partial side sectional illustration of another nosecone arranged with the turbine engine component.

The nosecone 58 may be configured as a unitary body, where the nosecone mount 64 is integral with the nosecone body 62. Alternatively, the nosecone mount 64 may be formed discrete from and subsequently fastened and/or bonded to the nosecone body 62. Still alternatively, referring to FIG. 3, the nosecone body 62 may be configured with a plurality of discrete axial segments such as, for example, a nosecone segment 80 and a cap segment 82. The nosecone segment 80 is arranged and connected axially between the cap segment 82 and the component 60. The nosecone, of course, may have various configurations other than those described above and illustrated in the drawings.

The nosecone 58 is injection molded, air assisted injection molded, compression molded and/or otherwise formed from at least thermoplastic material. More particularly, the nosecone body 62 and/or the nosecone mount 64 are each formed from one or more layers, where at least one of these layers includes the thermoplastic material. Examples of the thermoplastic material may include, but are not limited to, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyetheretherketone (PEEK), polyetherimide (PEI), thermoplastic polyimide, polyether ketone ketone (PEKK), polysulfone, high-temperature nylon, polyphenylsulfide, polyester, or any of the foregoing with fiber reinforcement (e.g., carbon fiber or glass-fiber). Such thermoplastic materials may, among other things, increase the resilience of the nosecone 58 to an impact with a hard body object such as, for example, a relatively large bird. In addition, the nosecone 58 may be manufactured at a relatively low cost where, for example, the nosecone 58 is formed via injection molding, air assisted injection molding or compression molding.

One or more of the layers of the nosecone body 62 and/or the nosecone mount 64 may also include one or more non-thermoplastic materials. Examples of the non-thermoplastic materials may include, but are not limited to, metal, aramid material (e.g., Kevlar® fibers, etc.), polycrystalline material (e.g., fibers of the one or more of the thermoplastic materials set forth above), thermoset material (e.g., epoxy resin, etc.), fiberglass, carbon fiber, carbon nanotube, ceramic materials (e.g., silicon carbide (SiC)), graphite, etc. One or more of the layers may also or alternatively include one or more reinforcement materials such as, for example, one or more of the non-thermoplastic materials and/or one or more additional thermoplastic materials described above in this paragraph and the previous paragraph. Such reinforcement materials may be included to, among other things, increase the structural rigidity of the nosecone 58.

Figure 4:
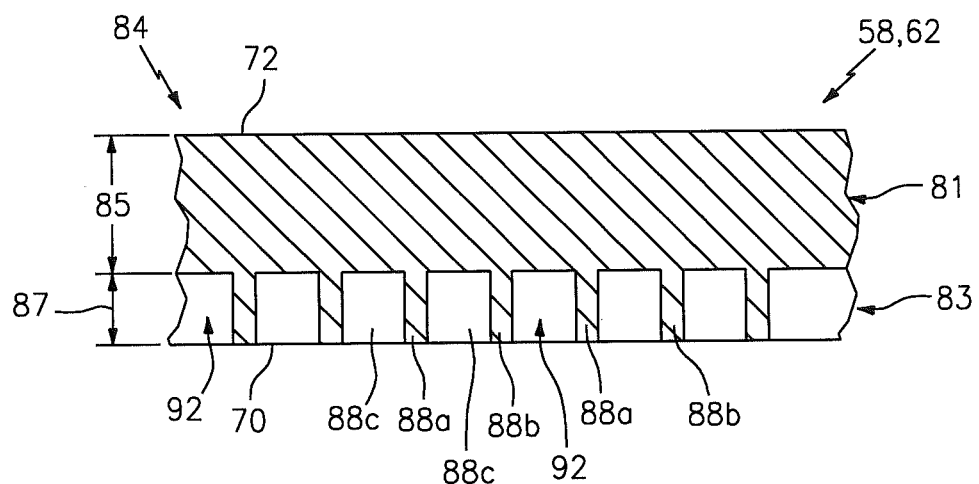
FIG. 4 is a sectional illustration of an embodiment of a portion of the nosecone of FIG. 2.

Referring to FIG. 4, the nosecone 58 includes a shell 81 (e.g., a dish-shaped nosecone shell) and a support structure 83. The shell 81 may be an outer (or inner) skin for the nosecone 58. The shell 81 extends from the support structure 83 to the nosecone exterior surface 72 (or alternatively the nosecone interior surface 70), thereby defining a shell thickness 85. The support structure 83 is adapted to structurally support and/or otherwise reinforce at least a portion of the shell 81. The support structure 83 extends from the shell 81 to the nosecone interior surface 70 (or alternatively the nosecone exterior surface 72), thereby defining a support structure thickness 87. This support structure thickness 87 may be greater than or substantially equal to about one half (½) of the shell thickness 85. In one embodiment, for example, the support structure thickness 87 may be greater than or substantially equal to the shell thickness 85. The present invention, however, is not limited to the foregoing dimensional relationships.

The support structure 83 is configured integral with the shell 81. The shell 81 and the support structure 83, for example, may be injection molded and/or otherwise formed as a layer 84 that extends between the nosecone interior surface 70 and the nosecone exterior surface 72. Alternatively, referring to FIG. 5, the shell 81 may be formed as a first layer 89 and the support structure 83 may be formed as a second layer 91. These layers 89 and 91 may be bonded together through, for example, compression molding, resin transfer molding (RTM), and/or any other suitable process.

Figure 5:
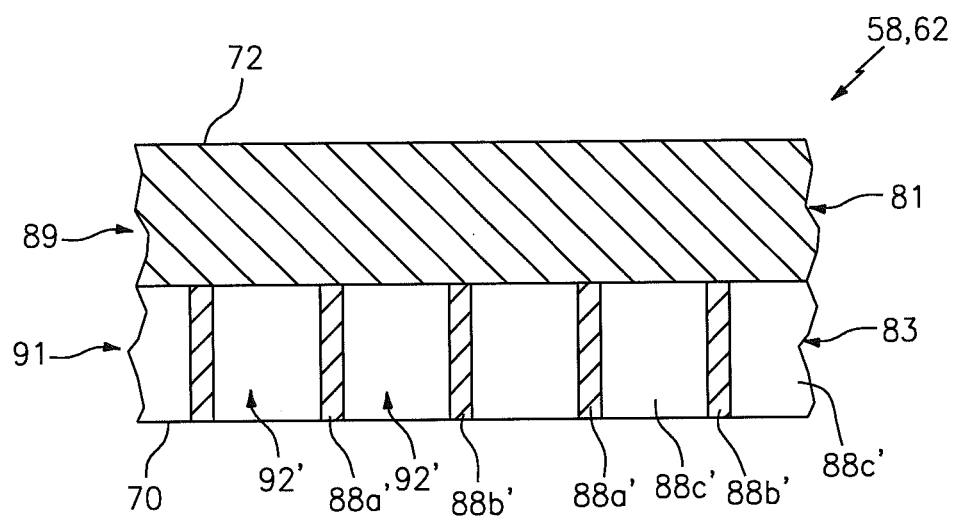
FIG. 5 is a sectional illustration of another embodiment of a portion of the nosecone of FIG. 2.

Referring to FIGS. 4 and 5, the shell 81 and/or the support structure 83 may each be formed from substantially solid thermoplastic material. Alternatively, the thermoplastic material may be a matrix in which fibers and/or particles of one or more of the reinforcement materials are at least partially embedded. For example, the shell 81 and/or the support structure 83 may each (or collectively) be formed as a pre-preg, where the thermoplastic material is pre-impregnated into the reinforcement material. The reinforcement material and the thermoplastic material may be subject to pressure and an elevated temperature, which enables the thermoplastic material to infiltrate into the reinforcement material to form a pre-preg. Alternatively or additionally, the thermoplastic material and the reinforcement material may be bonded together an adhesive bond.

Figure 6:
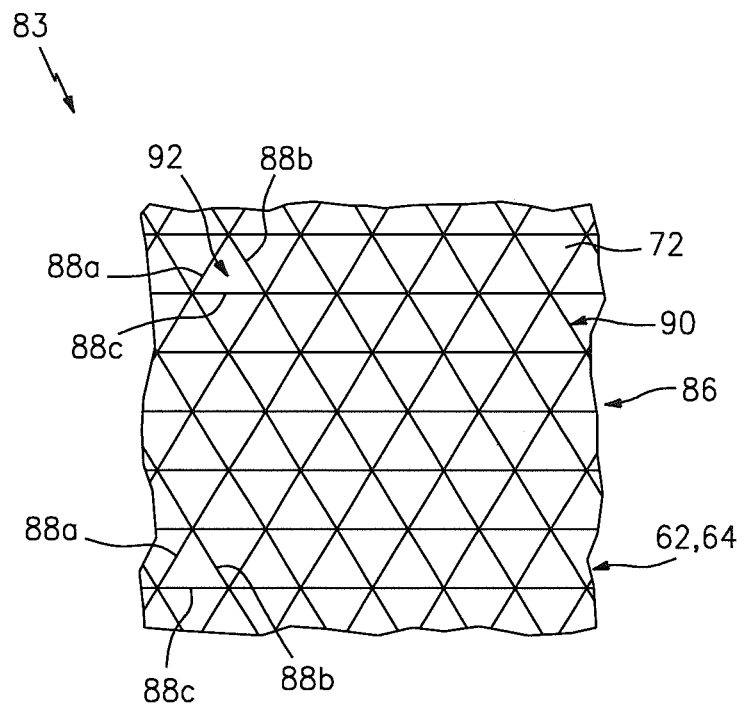
FIG. 6 is an illustration of a surface of the portion of the nosecone of FIG. 4.
Figure 7:
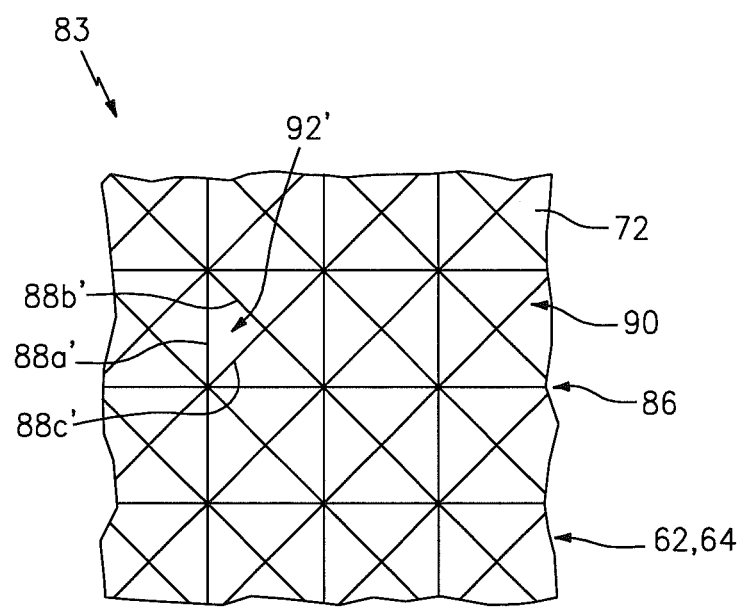
FIG. 7 is an illustration of a surface of the portion of the nosecone of FIG. 5.

The support structure 83 includes an arrangement of ribs 88*a-c* formed from a first material. The arrangement of ribs 88*a-c* provides a structural backbone for the shell 81 and the nosecone 58. The arrangement of ribs 88*a-c* may extend the thickness 87 of the support structure 83 between the shell 81 and the surface 70 (or alternatively the surface 72). Referring to FIG. 6, the arrangement of ribs 88*a-c* may be configured as an isogrid structure 90. The term "isogrid" may describe a structure with a plurality of ribs arranged in a repeating pattern. The arrangement of ribs 88*a-c* of FIG. 6, for example, defines a plurality of substantially uniform intra-rib gaps 92. Each of these gaps 92 may have a polygonal (e.g., triangular, rectangular, etc.) cross-sectional geometry. Alternatively, each of the gaps may have an arcuate (e.g., circular, elliptical, etc.) cross-sectional geometry. The ribs 88*a-c* defining at least one of the gaps 92 may be substantially uniform; e.g., have substantially equal lengths, heights and thickness. Alternatively, referring to FIG. 7, one of the ribs 88*a'* defining at least one of the gaps 92' may be different (e.g., have a longer length) than one or more of the other ribs 88*b'* and 88*c'* defining that gap 92'.

Referring to FIGS. 4 and 6, the arrangement of ribs 88*a-c* may be defined by at least one unitary body (e.g., a tubular or dish-shaped grid structure) that is injection molded, air assisted injection molded, compression molded, cast, milled, machined or otherwise formed. The arrangement of ribs, of course, may have various configurations other than those described above.

Figure 8:
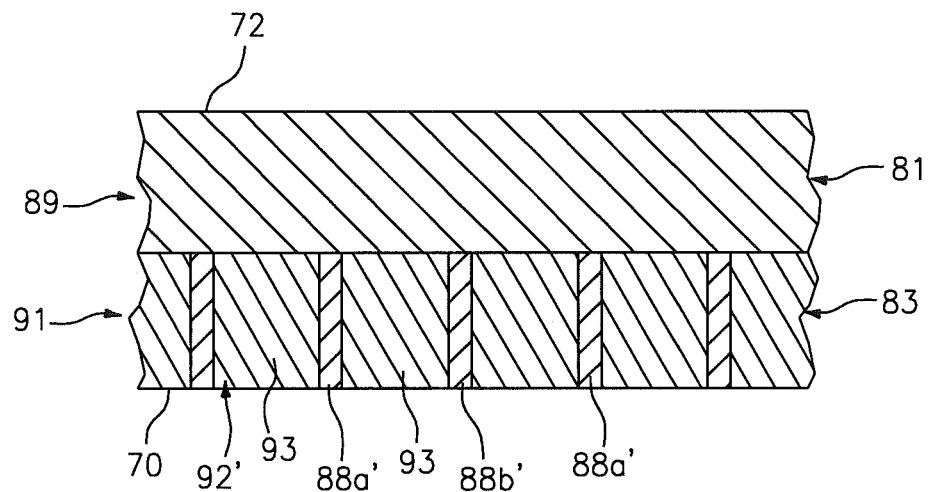
FIG. 8 is a sectional illustration of another embodiment of a portion of the nosecone of FIG. 2.

Referring now to the embodiment of FIG. 8, one or more of the gaps 92' may be at least partially filled with a second material 93. The second material 93 extends through each of the gaps 92' between nosecone interior surface 70 (or alternatively the nosecone exterior surface 72) and the shell 81. The first material, from which the arrangement of ribs 88*a'-c'* is formed, may be a reinforcement material such as metal. The second material 93 may be a thermoplastic material. Alternatively, the first material may be a thermoplastic material, and the second material 83 may be a non-thermoplastic material.

Figure 9:
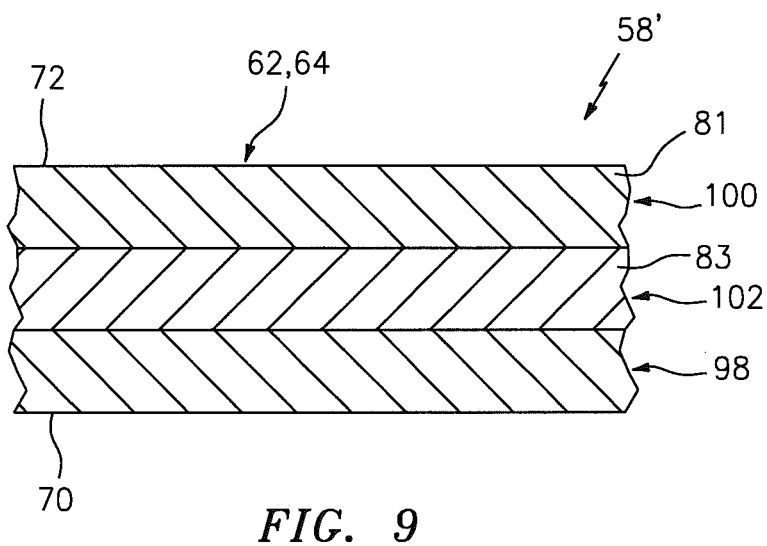
FIG. 9 is a sectional illustration of another embodiment of a portion of the nosecone of FIG. 2.

Referring now to the embodiment of FIG. 9, the nosecone 58 includes a first layer 98, a second layer 100 and a third layer 102. The first layer 98 is configured as the shell 81, and extends between the nosecone interior surface 70 and the third layer 102. The second layer 100 is configured as an interior shell, and extends between the nosecone exterior surface 72 and the third layer 102. The third layer 102 is configured as the support structure 83, and is arranged and extends between the first and the second layers 98 and 100. The first layer 98, the second layer 100 and/or the third layer 102 may each be formed from one or more materials which include thermoplastic material. Alternatively, one or two of the layers 98, 100 and 102 may be formed from one or more reinforcement materials. One or more of the materials in the first layer 98 may be configured into an arrangement of ribs (e.g., an isogrid structure). One or more of the materials in the second layer 100 may also or alternatively be configured into an arrangement of ribs (e.g., an isogrid structure). One or more of the materials in the third layer 102 may also or alternatively be configured into an arrangement of ribs (e.g., an isogrid structure).

Figure 10:
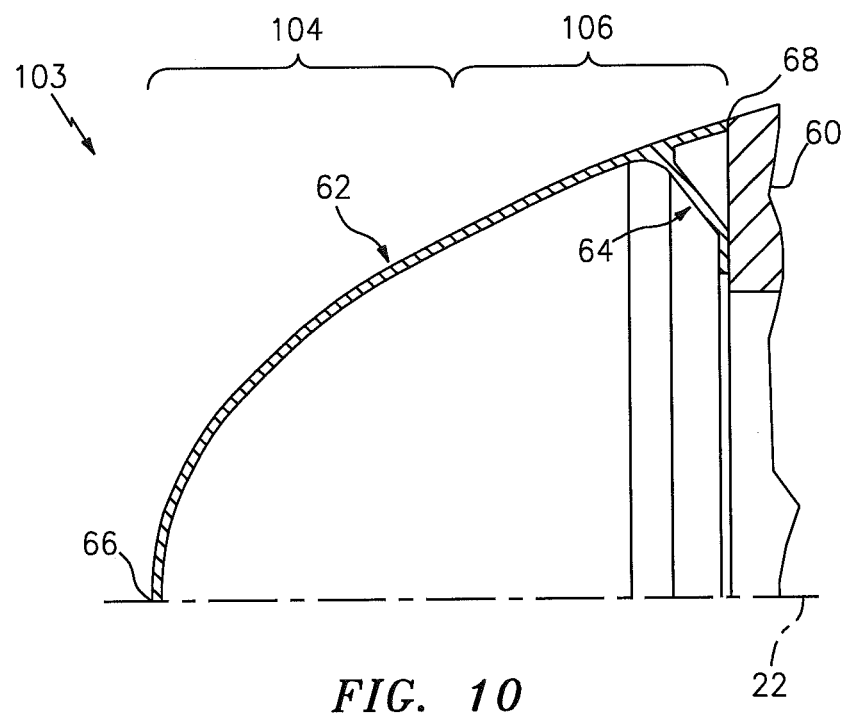
FIG. 10 is a partial side sectional illustration of a multi-region nosecone arranged with the turbine engine component.

FIG. 10 is a partial sectional illustration of another nosecone 103. In contrast to the nosecone 58 of FIG. 2, the nosecone 103 includes an upstream region 104 and a downstream region 106. The upstream region 104 is arranged between the tip end 66 and the downstream region 106. The downstream region 106 is arranged between the upstream region 104 and the base end 68. The upstream region 104 and the downstream region 106 each have a unique single or multi-layered construction. For example, one of the regions 104 or 106 may include a portion of a shell and an arrangement of ribs (e.g., an isogrid structure). The other one of the regions 106 or 104 may be configured with another portion of the shell, but without an arrangement of ribs. In addition or alternatively, one of the regions 104 or 106 may include a first number of layer(s), and the other one of the regions 106 or 104 may include a second number of layer(s) that is different than the first number. In addition or alternatively, one of the regions 104 or 106 may include one or more different materials than the other one of the regions 106 or 104.

Figure 11:
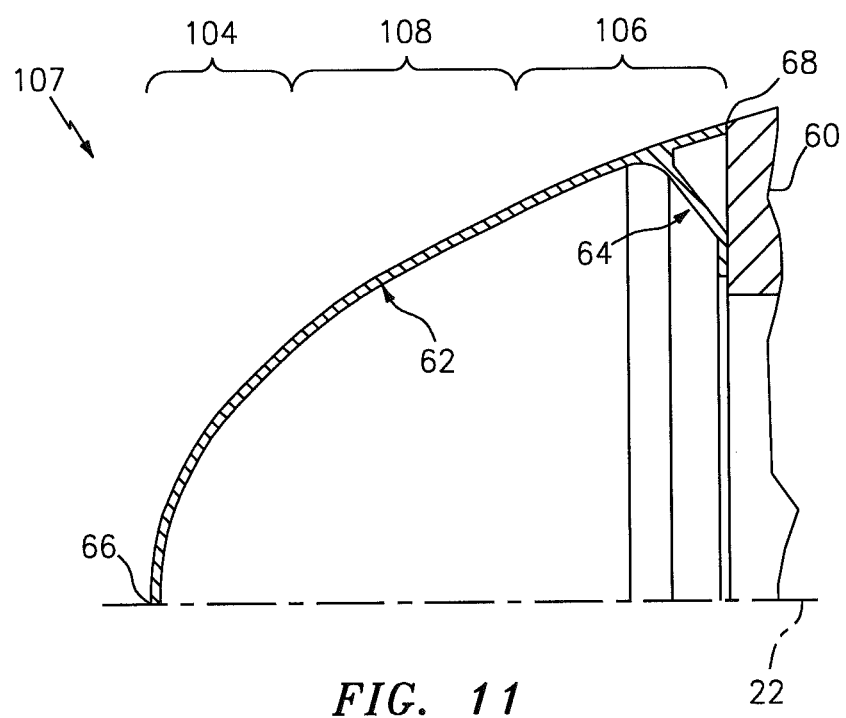
FIG. 11 is a partial side sectional illustration of another multi-region nosecone arranged with the turbine engine component.

FIG. 11 is a partial sectional illustration of another nosecone 107. In contrast to the nosecone 103 of FIG. 10, the nosecone 107 includes an intermediate region 108 arranged axially between the upstream region 104 and the downstream region 106. The intermediate region 108 may have a unique single or multi-layered construction relative to the upstream region 104 and/or the downstream region 106. The intermediate region 108 may be configured with an arrangement of ribs. Alternatively or additionally, one or both of the regions 104 and 104 may each be configured with (or without) an arrangement of ribs.

The nosecones 58, 103 and 107 may have various configurations other than those described above and/or illustrated in the drawings. For example, at least one of the layers may include a heating element adapted for deicing the nosecone during engine operation. At least a portion of the nosecone exterior surface 72 may be coated with a coating such as, for example, a flouroelastomer or polyeurethane coating. Referring to FIGS. 4 and 5, one or more of the intra-rib gaps may be filled with gas such as air. One or more of the layers may be laminated together. The present invention therefore is not limited to any particular nosecone configurations or formation techniques.

The terms "upstream", "downstream", "inner" and "outer" are used to orientate the nosecones described above relative to the turbine engine and its axis. A person of skill in the art will recognize, however, one or more of these components may be utilized in other orientations than those described above. The present invention therefore is not limited to any particular nosecone spatial orientations.

A person of skill in the art will recognize the nosecones may be included in various turbine engines other than the one described above. The nosecones, for example, may be included in a turbine engine where a gear train connects one or more shafts to one or more rotors in a fan section and/or a compressor section. Alternatively, the nosecones may be included in a turbine engine configured without a gear train. The nosecones may be included in a geared or non-geared turbine engine configured with a single spool, with two spools as illustrated in FIG. 1, or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A nosecone for a turbine engine, comprising:
a nosecone body extending along an axis between a tip end and a base end, the nosecone body comprising thermoplastic material, a shell and an arrangement of ribs that structurally support at least a portion of the shell, wherein a thickness of the arrangement of ribs is greater than or equal to one half of a thickness of the shell; and
a nosecone mount adapted to connect the nosecone body to a component of the turbine engine;
the thermoplastic material forming an outer radial exterior surface of the nosecone; and
the nosecone body further comprising a first region and a second region, the first region configured with the arrangement of ribs, the second region arranged axially between the first region and the base end, and the second region is configured without any arrangement of ribs;
the nosecone body further comprising a third region that is arranged axially between the first region and the tip end, and the third region is configured without any arrangement of ribs.

2. The nosecone of claim 1, wherein
the thickness of the arrangement of ribs is equal to or less than the thickness of the shell;
the arrangement of ribs comprises an isogrid structure that forms a plurality of triangular gaps interposed with the arrangement of ribs; and
the shell comprises a first material and the arrangement of ribs comprises a second material that is different from the first material.

3. The nosecone of claim 1, wherein
the ribs are configured in a repeating pattern that defines a plurality of intra-rib gaps; and
one or more of the plurality of intra-rib gaps each comprises one of a polygonal cross-sectional geometry and an arcuate cross-sectional geometry.

4. The nosecone of claim 1, wherein
the arrangement of ribs defines a plurality of intra-rib gaps; and
one or more of the intra-rib gaps are at least partially filled with the thermoplastic material.

5. The nosecone of claim 1, wherein the arrangement of ribs comprises the thermoplastic material or thermoset material.

6. The nosecone of claim 1, wherein
the thickness of the arrangement of ribs is equal to or less than the thickness of the shell;
the nosecone body comprises a first layer and a second layer that is stacked and bonded with the first layer;
the first layer comprises the shell; and
the second layer comprises the arrangement of ribs, and the arrangement of ribs comprises fibers of polycrystalline material.

7. The nosecone of claim 1, wherein
the nosecone body further comprises a nosecone segment and a cap segment that is fastened to the nosecone segment; and
one of the nosecone segment and the cap segment comprises the arrangement of ribs.

8. The nosecone of claim 1, wherein the arrangement of ribs comprises fibers of polycrystalline material.

9. The nosecone of claim 1, wherein the arrangement of ribs comprises metal.

10. The nosecone of claim 1, wherein
the arrangement of ribs are configured in a repeating pattern that defines a plurality of intra-rib gaps, the arrangement of ribs includes a first rib, a second rib and a third rib, and a length of the first rib is equal to a length of the second rib and is different than a length of the third rib; and
a first of the plurality of intra-rib gaps has a triangular cross-sectional geometry formed by the first rib, the second rib and the third rib.

11. The nosecone of claim 1, wherein
the arrangement of ribs are configured in a repeating pattern that forms a plurality of intra-rib gaps;
each of the plurality of intra-rib gaps has a triangular cross-sectional geometry; and
four ribs in the arrangement of ribs form a square shaped perimeter around a cluster of four of the plurality of intra-rib gaps.

12. The nosecone of claim 1, wherein one of the first region and the second region includes a different material than another one of the first region and the second region.

13. The nosecone of claim 1, wherein one of the first region and the second region includes a first number of layers and another one of the first region and the second region includes a second number of layers that is different than the first number of layers.

14. The nosecone of claim 1, wherein the first region has a unique single or multi-layered construction relative to the second region and the third region.

15. The nosecone of claim 1, wherein the thermoplastic comprises at least one of ethylene tetrafluoroethylene fluoropolymer (ETFE), perchloroethylene (PCE), or polyvinylidene fluoride (PVDF).

16. A nosecone for a turbine engine, comprising:
a nosecone body extending along an axis between a tip end and a base end, the nosecone body comprising thermoplastic material, a shell and an arrangement of ribs that structurally support at least a portion of the shell, wherein a thickness of the arrangement of ribs is greater than or equal to one half of a thickness of the shell; and
a nosecone mount adapted to connect the nosecone body to a component of the turbine engine;
the thermoplastic material forming an outer radial exterior surface of the nosecone; and
the nosecone body further comprises a first region and a second region that is configured with the arrangement of ribs and that is arranged axially between the first region and the base end, and the first region is configured without any arrangement of ribs.

17. The nosecone of claim 16, wherein one of the first region and the second region includes a different material than another one of the first region and the second region.

18. The nosecone of claim 16, wherein one of the first region and the second region includes a first number of layers and another one of the first region and the second region includes a second number of layers that is different than the first number of layers.

* * * * *